United States Patent [19]
Doi et al.

[11] 4,298,252
[45] Nov. 3, 1981

[54] REAR STOP TYPE LENS SYSTEM

[75] Inventors: Yoshikazu Doi, Omiya; Takaaki Uchida, Iwatsuki; Yutaka Sakai, Omiya, all of Japan

[73] Assignee: Fuji Photo Optical Co., Ltd., Japan

[21] Appl. No.: 71,046

[22] Filed: Aug. 30, 1979

[51] Int. Cl.³ .............................................. G02B 9/36
[52] U.S. Cl. ..................................... 350/470; 350/449
[58] Field of Search ............... 350/206, 221, 176, 449, 350/470

[56] References Cited
U.S. PATENT DOCUMENTS
3,895,857  7/1975  Imai ..................... 350/206

FOREIGN PATENT DOCUMENTS
577763  5/1946  United Kingdom ................ 350/221

Primary Examiner—John K. Corbin
Assistant Examiner—Scot J. Sugarman
Attorney, Agent, or Firm—Eyre, Mann, Lucas & Just

[57] ABSTRACT

A rear stop type lens with highly corrected comatic flare is constituted of one convex meniscus lens, two concave lenses and one biconvex lens arranged in the order mentioned from the object side.

5 Claims, 12 Drawing Figures

SPHERICAL ABERRATION
SINE CONDITION

ASTIGMATISM
—— SAGITTAL
--- MERIDIONAL

DISTORTION

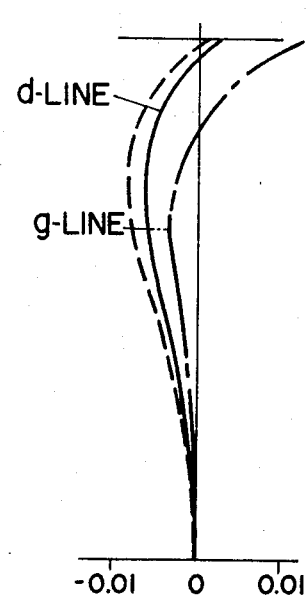
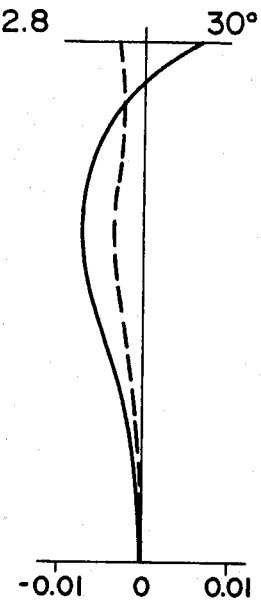
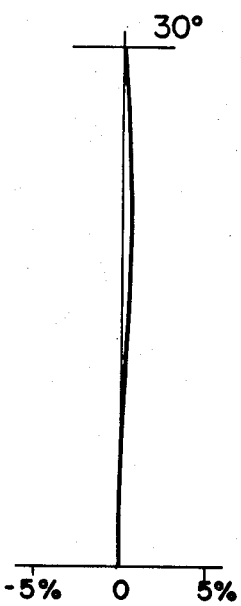
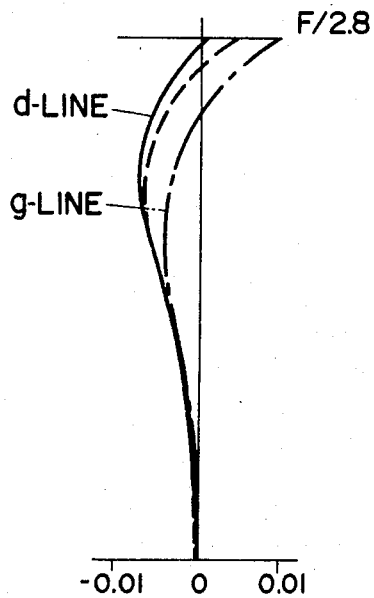
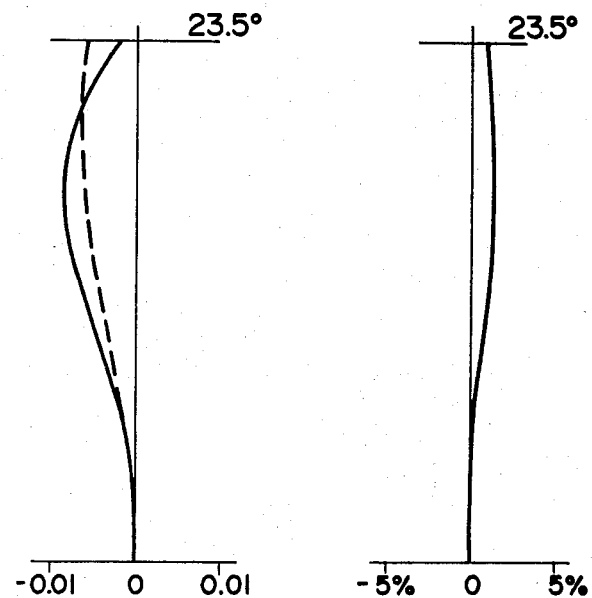

REAR STOP TYPE LENS SYSTEM

BACKGROUND OF THE INVENTION

1. Field of the Invention

This invention relates to a lens, and more particularly to a rear stop type lens whose comatic flare is corrected to a high degree without aggravating other aberrations.

2. Description of the Prior Art

In the lens wherein the diaphragm is positioned to the rear of the lens, the asymmetry is considerably greater than in a lens of the type which has a diaphragm inside the lens system. As a result, the correction of aberrations in this type lens becomes extremely difficult. Particularly, the correction of comatic aberration of the oblique ray passing through the lower half portion of the diaphragm becomes a difficult problem. The reason is as follows. In the ordinary lens, the range of luminous flux used can be freely selected for maximum advantage in correction and the luminous flux itself can be controlled by stopping down the diaphragm. In contrast, in the rear stop type lens, the oblique ray is utilized down to a much lower portion than in the ordinary lens for the purpose of precluding the phenomenon of shading due to the stopping down of the diaphragm (particularly in the type of camera wherein, by reason of the camera structure, the lens only is set forward with the diaphragm left behind) and, as a result, the correction of comatic aberration becomes difficult. In addition, the width of the luminous flux in the lower half portion of the diaphragm tends to decrease when the stop is opened to its full extent. When comatic flare remains in this portion, it cannot be eliminated in the commonly used range of from F/5.6 to F/8. Consequently, the image contrast is seriously impaired. Particularly since program type shutters are often used in the medium-priced cameras in which the lenses are mainly used, the photographer is not allowed to control the aperture as he wishes. Since the diaphragm in such a camera is kept open very widely even under ordinary brightness, comatic flare is aggravated to the point of causing a serious problem.

Heretofore, among the rear stop type lenses of this kind, those of Tessar configuration have had the widest use. Lenses of Tessar configuration, however, are disadvantageous because the second and third surfaces generate strong divergence and because they tend to cause the aforementioned comatic flare of the luminous flux in the lower half portion of the diaphragm since the third surface is strongly concave in the direction of the object. This comatic flare cannot easily be eliminated by merely stopping down the diaphragm. As a result, the image contrast is seriously impaired.

SUMMARY OF THE INVENTION

With a view to overcoming the drawbacks described above, the present invention provides a lens which is composed of four single-lens groups, namely one convex, one concave, one concave and one convex lens, and therefore, has conditions which contribute to correction of comatic flare.

Now, the present invention will be described in detail with reference to the preferred embodiments which are illustrated in the drawing.

BRIEF DESCRIPTION OF THE DRAWING

FIGS. 3A-3C and 4A-4C show the spherical aberration, sine condition, astigmatism and distortion of Example 2 and of Example 3, respectively.

PREFERRED EMBODIMENTS OF THE INVENTION

Figure 1:
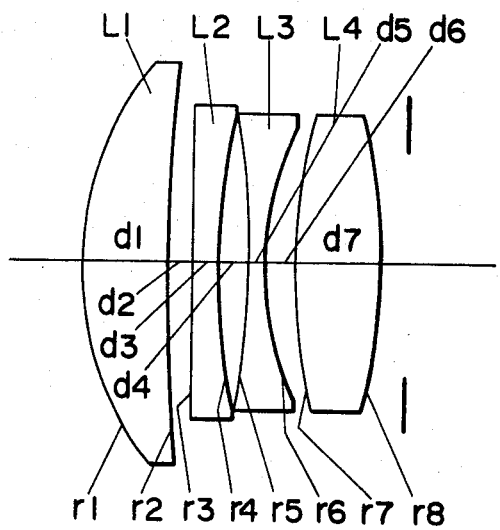
FIG. 1 is a diagram which shows the lens system according to this invention.
Figure 2A:
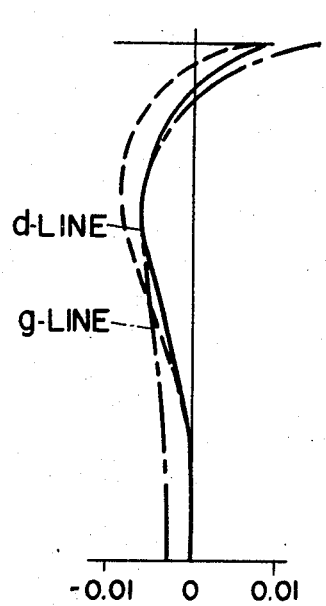
FIGS. 2A-2C show the spherical aberration, sine condition, astigmatism and distortion of the lens system of Example 1, respectively.
Figure 2B:
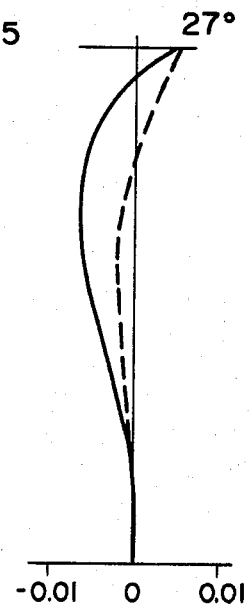
Figure 2C:
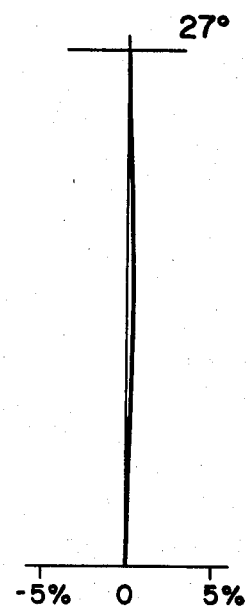

In FIG. 1, there is illustrated a lens system wherein one convex meniscus lens L1 having its convex surface on the object side, two concave lenses L3 and L2 each having its concave surface of smaller radius of curvature on the image side and one biconvex lens L4 are arranged in the order mentioned from the object side and a diaphragm is positioned immediately to the rear of the lens L4. This lens system is characterized by satisfying the following requirements:

$$0.4 < 1/r2 - 1/r3 < 0.8, \quad -0.2 < -\frac{1}{r3} < 0.2 \tag{1}$$

$$1.0 < 1/r6 - 1/r7 < 1.5 \tag{2}$$

$$2.4 < 1/r1 < 3.2 \tag{3}$$

$$1.7 < N1, N4 \tag{4}$$

wherein, r1, r2, r3, r6 and r7 denote the radii of curvature respectively of the first, second, third, sixth and seventh surfaces and N1 and N4 denote the refractive indices respectively of the lenses L1 and L4.

The requirement (1) is essential for the purpose of favorably coping with the phenomenon of comatic flare of the luminous flux of the oblique ray which occurs in the lower half portion of the diaphragm. The occurrence of comatic flare is prevented in the present lens system by decreasing the value of (1/r2−1/r3) to about one half to one third of the value usual in the conventional Tessar type lens system and further decreasing the absolute value of 1/r3. As a result, the portion in question becomes deficient in divergence. The next requirement (2) is intended to make up for this deficiency in divergence. If the upper limit of the requirement (2) is exceeded, sufficient correction of comatic flare cannot be accomplished. If the lower limit is not reached, the divergence decreases too much to permit easy correction of aberrations in the entire lens system.

The requirement (2), as described above, is intended to make up for the deficiency in divergence in the second and third surfaces. The entire lens system will suffer from insufficient correction of aberrations unless the value indicated is properly selected in the range defined. If the upper limit is exceeded, the spherical aberration and astigmatism are overcorrected and the comatic flare of the luminous flux in the lower half portion of the diaphragm becomes large. Conversely if the lower limit is not reached, correction of spherical aberration and astigmatism is insufficient.

The requirement (3) is for the purpose of providing favorable correction of the astigmatism and image distortion so as to embrace a half image angle as wide as about 30°. The desired correction is not sufficiently attained if the lower limit of this requirement is not reached. Conversely if the upper limit is exceeded, strong spherical aberration arises in the first surface so as to make difficult the correction of aberrations in the entire lens system.

The requirement (4) serves the purpose of decreasing the Petzval sum to smoothen the image surface and, at the same time, decreasing the radii of curvature of the first and fourth lenses to lessen the aberrations which occur in the respective lenses.

By meeting the various requirements described above, there can be obtained a lens system having a brightness of F/2.5 to 2.8, an image angle is 47° to 60° and wherein the conditions of the various aberrations, particularly those affecting image contrast, are favorable. The particulars of typical lenses which satisfy all these requirements will be shown below by way of illustration.

EXAMPLE 1

| Radius of Curvature | Distance | Refractive Index | Abbe Number |
|---|---|---|---|
| r1 0.39416 | | | |
| | d1 0.12 | N1 1.77252 | ν1 49.6 |
| r2 2.02963 | | | |
| | d2 0.03 | | |
| r3 ∞ | | | |
| | d3 0.03 | N2 1.71736 | ν2 29.5 |
| r4 1.06394 | | | |
| | d4 0.03 | | |
| r5 −0.95247 | | | |
| | d5 0.02 | N3 1.68893 | ν3 31.1 |
| r6 0.40530 | | | |
| | d6 0.04 | | |
| r7 0.89928 | | | |
| | d7 0.1 | N4 1.83565 | ν4 42.3 |
| r8 −0.65147 | | | |
| 8th face - iris | | 0.03 | |
| focal lenght | | 1.0 | |
| F-number | | 2.5 | |
| angle of view | | 54° | |

EXAMPLE 2

| Radius of Curvature | Distance | Refractive Index | Abbe Number |
|---|---|---|---|
| r1 0.36347 | | | |
| | d1 0.105 | N1 1.77252 | ν1 49.6 |
| r2 2.05592 | | | |
| | d2 0.026 | | |
| r3 ∞ | | | |
| | d3 0.034 | N2 1.68893 | ν2 31.1 |
| r4 0.78789 | | | |
| | d4 0.034 | | |
| r5 −1.23592 | | | |
| | d5 0.02 | N3 1.68893 | ν3 31.1 |
| r6 0.35324 | | | |
| | d6 0.034 | | |
| r7 0.68532 | | | |
| | d7 0.101 | N4 1.7859 | ν4 44.0 |
| r8 −0.68532 | | | |
| 8th face - iris | | 0.03 | |
| focal length | | 1.0 | |
| F-number | | 2.8 | |
| angle of view | | 60° | |

EXAMPLE 3

| Radius of Curvature | Distance | Refractive Index | Abbe Number |
|---|---|---|---|
| r1 0.33728 | | | |

*-continued*

| Radius of Curvature | Distance | Refractive Index | Abbe Number |
|---|---|---|---|
| | d1 0.092 | N1 1.77252 | ν1 49.6 |
| r2 1.38888 | | | |
| | d2 0.036 | | |
| r3 ∞ | | | |
| | d3 0.022 | N2 1.68893 | ν2 31.1 |
| r4 0.74488 | | | |
| | d4 0.036 | | |
| r5 −0.77072 | | | |
| | d5 0.018 | N3 1.68893 | ν3 31.1 |
| r6 0.32156 | | | |
| | d6 0.022 | | |
| r7 0.52016 | | | |
| | d7 0.088 | N4 1.7859 | ν4 44.0 |
| r8 −0.52016 | | | |
| 8th face - iris | | 0.044 | |
| focal lenght | | 1.0 | |
| F-number | | 2.8 | |
| angle of view | | 47° | |

FIGS. 2A-2C, 3A-3C and 4A-4C show the spherical aberration, sine condition, astigmatism and distortion respectively involved in Examples 1, 2 and 3.

Figure 5A:
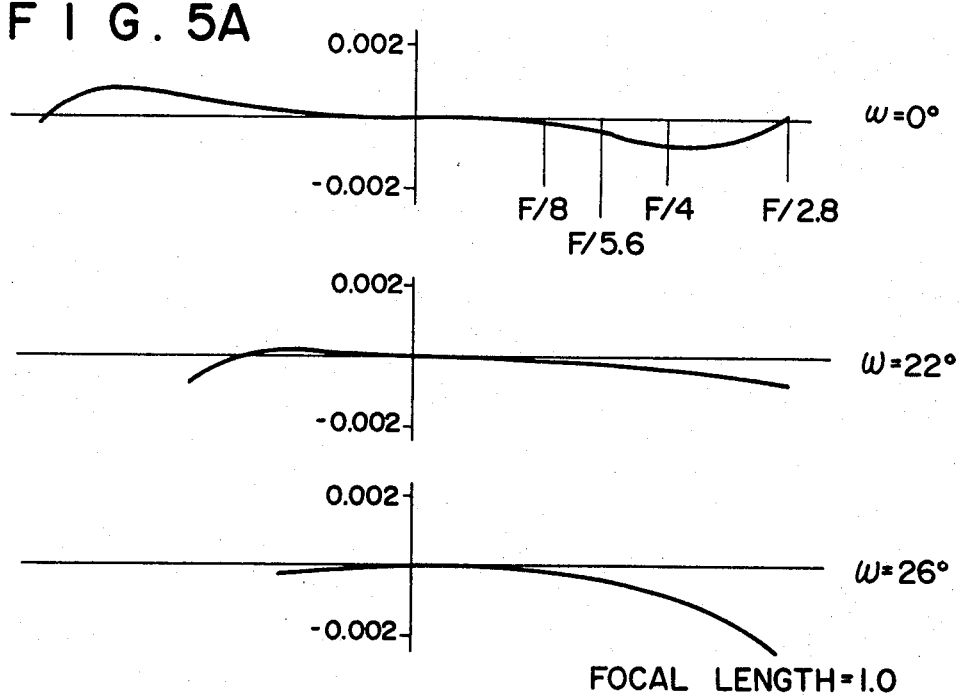
FIGS. 5A and 5B show the comatic aberration involved in the lens system of Example 2 and the comatic aberration involved in the Tessar type lens system, respectively.
Figure 5B:
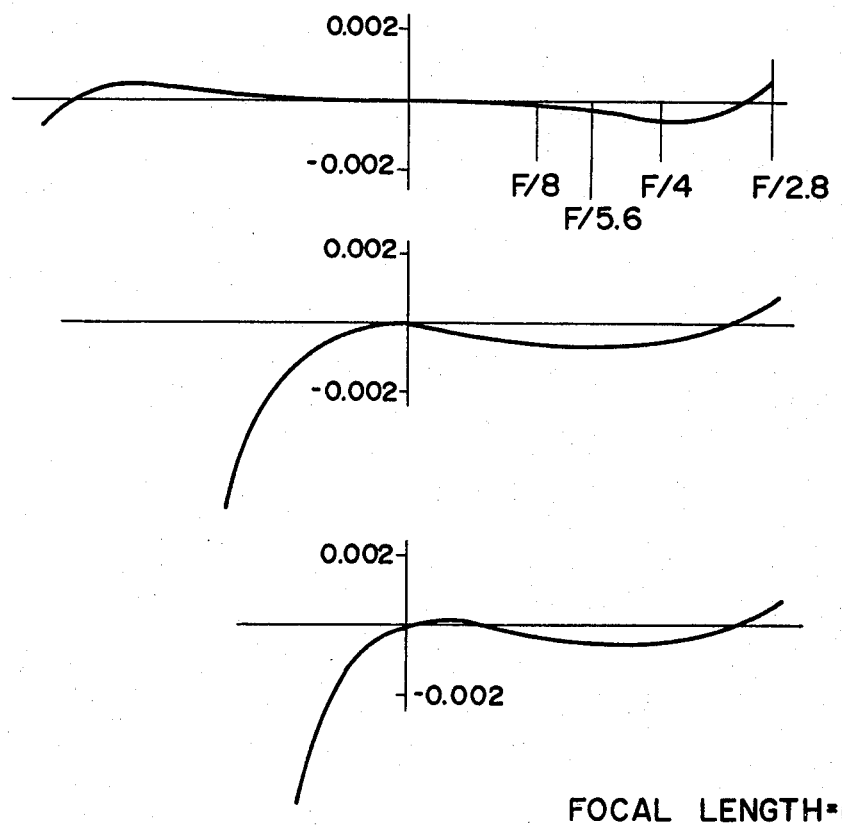

FIGS. 5A and 5B compare the comatic aberration (5A) involved in Example 2 of the present invention with that (5B) involved in the ordinary Tessar type lens system. The comparison clearly shows that the lens system of this invention enjoys notable improvement in the condition of comatic aberration in the central portion through the peripheral portion. Particularly with respect to the lower half portion, the lens system according to this invention produces highly advantageous conditions of comatic flare, whereas the Tessar type lens system suffers from strong comatic flare and entails the aforementioned disadvantage. Thus, the effect of the improvement brought about by this invention is evident.

We claim:

1. A lens system wherein one convex meniscus lens L1 having its convex surface directed toward the object side, two concave lenses L3 and L2 each having a concave surface of small radius of curvature directed toward the image side and one biconvex lens L4 are arranged in the order mentioned from the object side and a diaphragm is positioned immediately to the rear of the lens L4, which lens system is characterized by satisfying the following requirements:

$$0.4 < 1/r2 - 1/r3 < 0.8, \quad -0.2 < -\frac{1}{r3} < 0.2 \quad (1)$$

$$1.0 < 1/r6 - 1/r7 < 1.5 \quad (2)$$

$$2.4 < 1/r1 < 3.2 \quad (3)$$

$$1.7 < \nu1, \nu4 \quad (4)$$

wherein r1, r2, r3, r6 and r7 denote the radii of curvature respectively of the first, second, third, sixth and seventh surfaces and N1 and N4 denote the refractive indices respectively of the lenses L1 and L4.

2. A lens system wherein one convex meniscus lens L1 having its convex surface directed toward the object side, two concave lenses L2 and L3 each having a concave surface of small radius of curvature directed toward the image side and one biconvex lens L4 are arranged in the order mentioned from the object side and a diaphragm is positioned immediately to the rear of the lens L4, which lens system is characterized by satisfying the following requirements:

$$0.4 < 1/r2 - 1/r3 < 0.8, r3 = \infty \quad (1)$$
$$1.1 < 1/r6 - 1/r7 < 1.4, \quad (2)$$
$$2.5 < 1/r1 < 3.0, \text{ and} \quad (3)$$
$$N_1 \approx 1.772, 1.78 < N_4 < 1.84 \quad (4)$$

3. A lens system wherein one convex meniscus lens L1 having its convex surface directed toward the object side, two concave lenses L2 and L3 each having a concave surface of small radius of curvature directed toward the image side and one biconvex lens L4 are arranged in the order mentioned from the object side and a diaphragm is positioned immediately to the rear of the lens L4 and wherein the following conditions are satisfied:

| Radius of Curvature | Distance | Refractive Index | Abbe Number |
|---|---|---|---|
| r1 0.39416 | | | |
| | d1 0.12 | N1 1.77252 | ν1 49.6 |
| r2 2.02963 | | | |
| | d2 0.03 | | |
| r3 ∞ | | | |
| | d3 0.03 | N2 1.71736 | ν2 29.5 |
| r4 1.06394 | | | |
| | d4 0.03 | | |
| r5 −0.95247 | | | |
| | d5 0.02 | N3 1.68893 | ν3 31.1 |
| r6 0.40530 | | | |
| | d6 0.04 | | |
| r7 0.89928 | d7 0.1 | N4 1.83565 | ν4 42.3 |
| r8 −0.65147 | | | |
| 8th face - iris | | 0.03 | | where r, d, N and ν, respectively, designate the radii of curvature of the refracting surfaces, the axial air separations or thickness of lenses, the refractive indices for the sodium d-line and the Abbe dispersion numbers numbered by subscripts in order from front to rear.

4. A lens system wherein one convex meniscus lens L1 having its convex surface directed toward the object side, two concave lenses L2 and L3 each having a concave surface of small radius of curvature directed toward the image side and one biconvex lens L4 are arranged in the order mentioned from the object side and a diaphragm is positioned immediately to the rear of the lens L4 and wherein the following conditions are satisfied:

| Radius of Curvature | Distance | Refractive Index | Abbe Number |
|---|---|---|---|
| r1 0.36347 | | | |
| | d1 0.105 | N1 1.77252 | ν1 49.6 |
| r2 2.05592 | | | |
| | d2 0.026 | | |
| r3 ∞ | | | |
| | d3 0.034 | N2 1.68893 | ν2 31.1 |
| | d4 0.034 | | |
| r5 −1.23592 | | | |
| | d5 0.02 | N3 1.68893 | ν3 31.1 |
| r6 0.35324 | | | |
| | d6 0.034 | | |
| r7 0.68532 | | | |
| | d7 0.101 | N4 1.7859 | ν4 44.0 |
| r8 −0.68532 | | | |
| 8th face - iris | | 0.03 | | where r, d, N and ν, respectively, designate the radii of curvature of the refracting surfaces, the axial air separations or thickness of lenses, the refractive indices for the sodium d-line and the Abbe dispersion numbers numbered by subscripts in order from front to rear.

5. A lens system wherein one convex meniscus lens L1 having its convex surface directed toward the object side, two concave lenses L2 and L3 each having a concave surface of small radius of curvature directed toward the image side and one biconvex lens L4 are arranged in the order mentioned from the object side and a diaphragm is positioned immediately to the rear of the lens L4 and wherein the following conditions are satisfied:

| Radius of Curvature | Distance | Refractive Index | Abbe Number |
|---|---|---|---|
| r1 0.33728 | | 0.092 | |
| | d1 0.092 | N1 1.77252 | ν1 49.6 |
| r2 1.38888 | | | |
| | d2 0.036 | | |
| r3 ∞ | | | |
| | d3 0.022 | N2 1.68893 | ν2 31.1 |
| r4 0.74488 | | | |
| | d4 0.036 | | |
| r5 −0.77072 | | | |
| | d5 0.018 | N3 1.68893 | ν3 31.1 |
| r6 0.32156 | | | |
| | d6 0.022 | | |
| r7 0.52016 | | | |
| | d7 0.088 | N4 1.7859 | ν4 44.0 |
| r8 −0.52016 | | | |
| 8th face - iris | | 0.044 | | where r, d, N and ν, respectively, designate the radii of curvature of the refracting surfaces, the axial air separations or thickness of lenses, the refractive indices for the sodium d-line and the Abbe dispersion numbers numbered by subscripts in order from front to rear.

* * * * *